US012460713B2

(12) United States Patent
Palfai et al.

(10) Patent No.: US 12,460,713 B2
(45) Date of Patent: Nov. 4, 2025

(54) VARIABLE STIFFNESS DEVICE TO ABSORB BACKLASH IN SPLINED COMPONENTS

(71) Applicant: Atieva, Inc., Newark, CA (US)

(72) Inventors: Balazs Palfai, Newark, CA (US);
Michael Abosch, San Francisco, CA (US); Jiajun Wu, San Jose, CA (US);
Ahmad Abdullah Alawaji, Fremont, CA (US)

(73) Assignee: Atieva, Inc., Newark, CA (US)

( * ) Notice: Subject to any disclaimer, the term of this patent is extended or adjusted under 35 U.S.C. 154(b) by 0 days.

(21) Appl. No.: 18/700,370

(22) PCT Filed: Oct. 17, 2022

(86) PCT No.: PCT/US2022/078186
§ 371 (c)(1),
(2) Date: Apr. 11, 2024

(87) PCT Pub. No.: WO2023/069883
PCT Pub. Date: Apr. 27, 2023

(65) Prior Publication Data
US 2025/0224028 A1    Jul. 10, 2025

Related U.S. Application Data

(60) Provisional application No. 63/262,663, filed on Oct. 18, 2021.

(51) Int. Cl.
*F16H 1/10*    (2006.01)
*F16D 1/10*    (2006.01)
(Continued)

(52) U.S. Cl.
CPC .......... *F16H 57/028* (2013.01); *F16D 1/101* (2013.01); *F16H 57/023* (2013.01);
(Continued)

(58) Field of Classification Search
CPC ............. F16H 2057/02047; F16D 3/10; F16D 2001/103; F16D 1/108
See application file for complete search history.

(56) References Cited

U.S. PATENT DOCUMENTS 3,480,310 A    11/1969    Mcelwain
4,392,759 A    7/1983    Cook
(Continued)

FOREIGN PATENT DOCUMENTS

DE    102017200860 A1 *    7/2018
EP    1286079 A2    2/2003
(Continued)

OTHER PUBLICATIONS

International Search Report and Written Opinion for PCT Application No. PCT/US2022/078186, mailed on Jan. 17, 2023, 10 pages.
(Continued)

*Primary Examiner* — Stacey A Fluhart
(74) *Attorney, Agent, or Firm* — Brake Hughes Bellermann LLP

(57) ABSTRACT

One or more variable stiffness devices may be positioned between the splined coupling of a pair of rotating mechanical components to reduce or substantially eliminate backlash during operation. The variable stiffness device may include a spring pin that exerts a variable biasing force on mating surfaces of the pair of rotating mechanical components to maintain a relative position of the components in response to rotational and/or torsional forces exerted during operation.

18 Claims, 9 Drawing Sheets

(51) Int. Cl.
   *F16H 57/023* (2012.01)
   *F16H 57/028* (2012.01)
   *F16H 57/02* (2012.01)
(52) U.S. Cl.
   CPC ............... *F16D 2001/103* (2013.01); *F16D 2250/0084* (2013.01); *F16D 2300/12* (2013.01); *F16D 2300/22* (2013.01); *F16H 2057/02034* (2013.01); *F16H 2057/02052* (2013.01)

(56) References Cited

U.S. PATENT DOCUMENTS

| | | | | |
|---|---|---|---|---|
| 6,222,293 | B1* | 4/2001 | Ikeda | F02N 15/046 290/38 A |
| 2003/0202846 | A1* | 10/2003 | Breese | F16C 3/035 403/359.3 |
| 2015/0082929 | A1 | 3/2015 | Isomura | |
| 2016/0025188 | A1* | 1/2016 | Kim | F16H 3/44 475/12 |
| 2020/0378309 | A1* | 12/2020 | Beck | F16H 55/17 |

FOREIGN PATENT DOCUMENTS

| | | | | |
|---|---|---|---|---|
| EP | 2090493 | A1 * | 8/2009 | B62D 1/185 |
| JP | H1058993 | A | 3/1998 | |
| JP | 3770540 | B2 * | 4/2006 | |
| JP | 2019147524 | A | 9/2019 | |

OTHER PUBLICATIONS

Extended European Search Report for European Application No. 22884604.4, mailed Sep. 2, 2025, 9 pages.

* cited by examiner

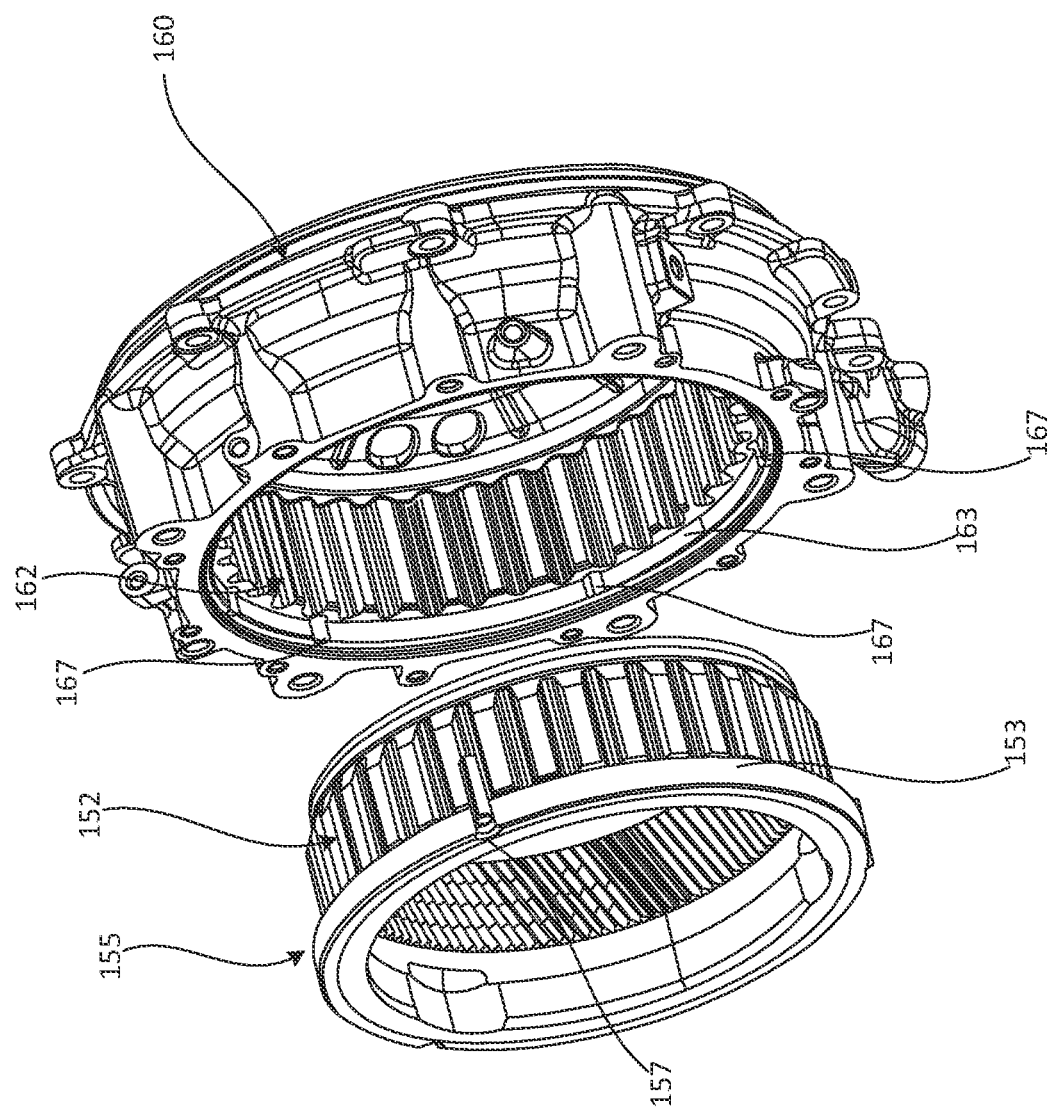

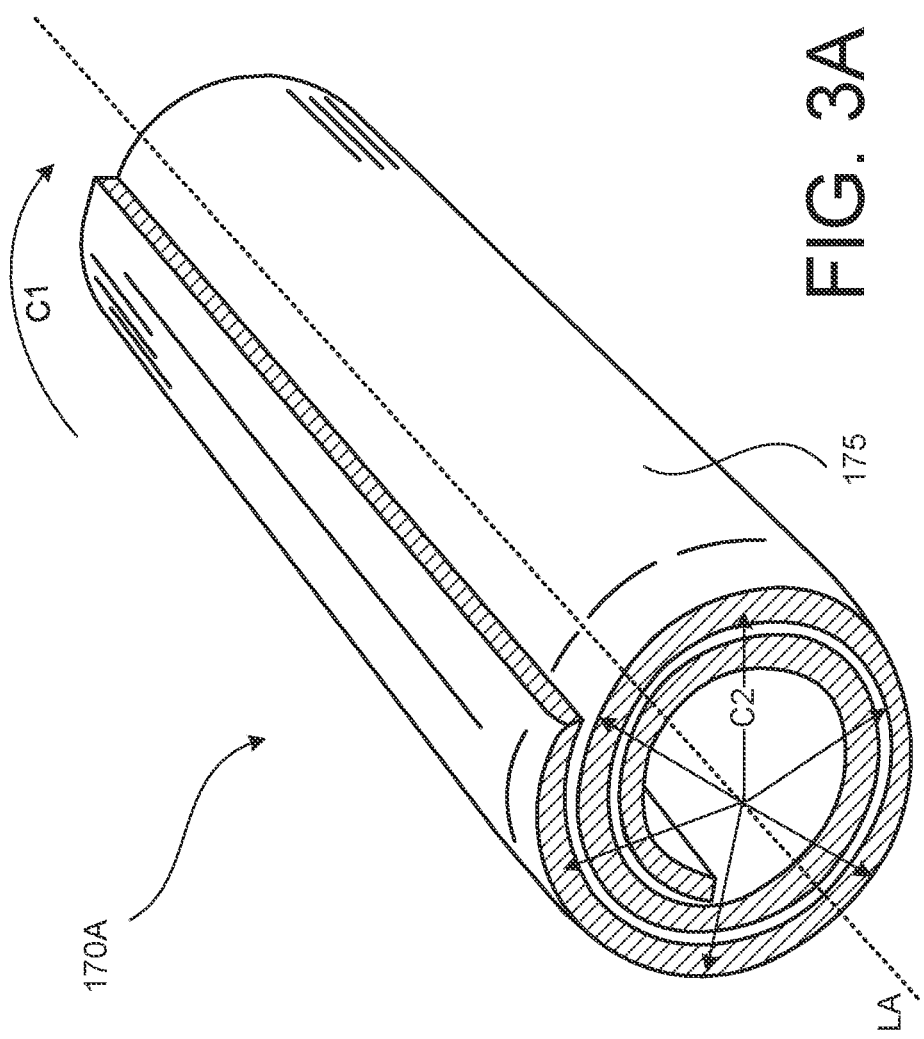

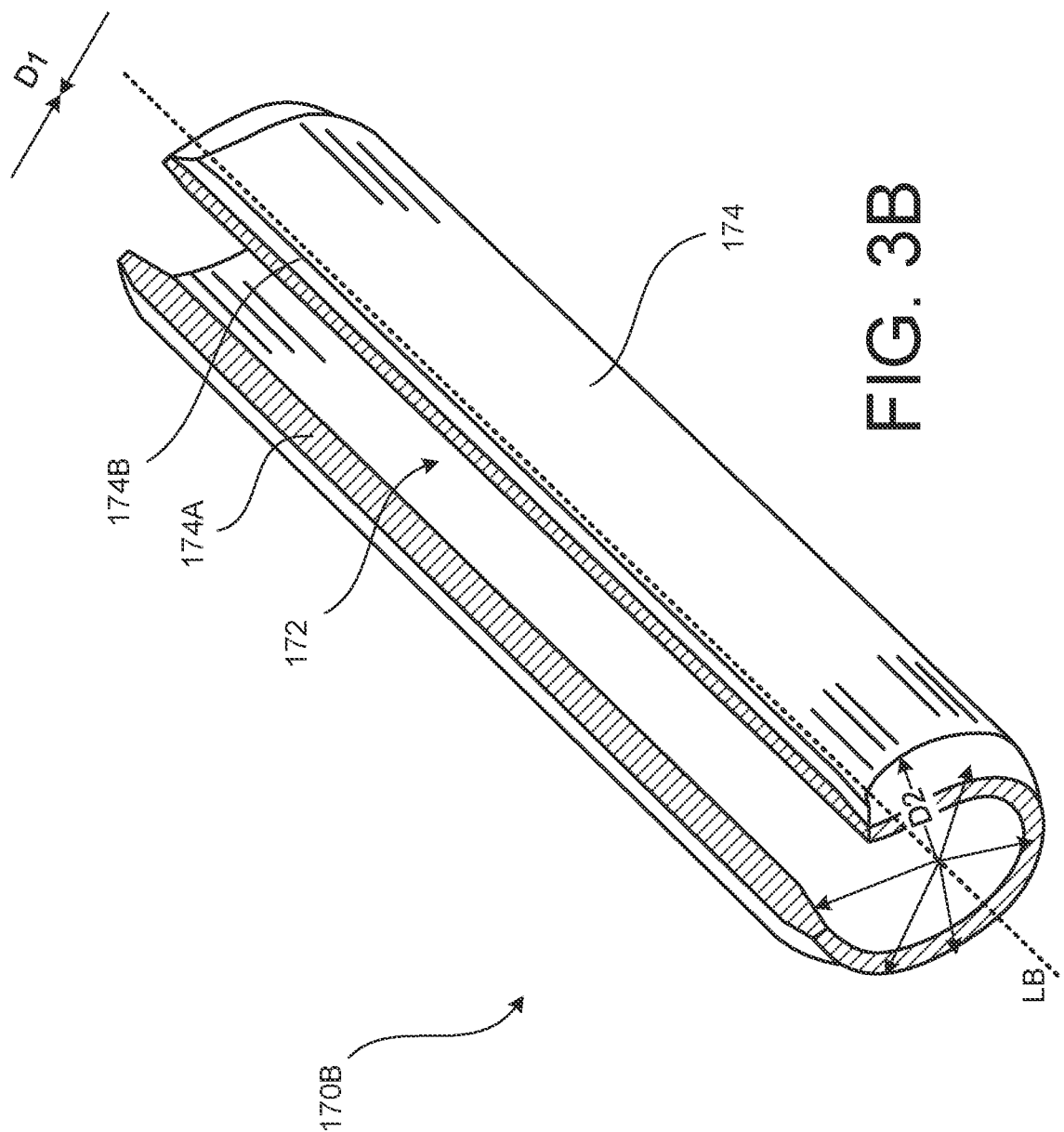

VARIABLE STIFFNESS DEVICE TO ABSORB BACKLASH IN SPLINED COMPONENTS

CROSS-REFERENCE TO RELATED APPLICATION

This application is a 35 U.S.C. § 371 National Phase Entry Application from PCT Application No. PCT/US2022/078186, filed on Oct. 17, 2022, entitled "VARIABLE STIFFNESS DEVICE TO ABSORB BACKLASH IN SPLINED COMPONENTS", and designating the U.S., which claims priority to U.S. Provisional Patent Application No. 63/262,663, filed on Oct. 18, 2021, entitled "VARIABLE STIFFNESS DEVICE TO ABSORB BACKLASH IN SPLINED COMPONENTS," the disclosures of which are incorporated by reference herein in their entireties.

TECHNICAL FIELD

This disclosure relates to reduction of backlash in splined components.

BACKGROUND

Coupling of rigid mechanical members or components, and in particular the coupling of tubular components such as coaxial shafts, shafts and hubs, and the like may make use of splined mating surfaces to effect a substantially rigid coupling between the mechanical components. Clearances, or tolerances between the inner and outer spline teeth of the components to be joined by the splined coupling facilitate the positioning of the inner component having inner spline teeth aligned within outer spline teeth of the outer component. These clearances, or tolerances between the inner and outer spline teeth also facilitate the decoupling of the inner and outer components without damage or destruction to the inner and/or outer component, providing for re-installation and/or re-use of the inner and/or outer components. During operation, rotational and/or torsional forces exerted on the coupled rigid mechanical components may give rise to backlash, due to relative movement of the coupled rigid mechanical components afforded by the clearances between adjacent surfaces of the inner and outer spline teeth.

This backlash may produce unwanted noise and/or vibration, and may cause premature wear of the affected components. For example, in a vehicle, backlash can contribute to noise, vibration and harshness (NVH) issues in the vehicle. In some instances, the first and second components may be manufactured such that the respective splined mating surfaces produce a press fit, or an interference fit, between the assembled first and second components. The press fit, or interference fit of the first and second components may result in some reduction of backlash, but may produce high hoop stresses that may be unsustainable over a period of operation. In some instances, the splined mating surfaces may include features that secure a relative position of the splined mating surfaces of the assembled first and second components, such as barbs on one of the splined mating surfaces that penetrate the other of the splined mating surfaces as the first and second components are assembled. While the joining/splined coupling of the first and second components in this manner may reduce/eliminate clearances between the splined mating surfaces, this manner of assembly precludes disassembly without destruction of one or both of the first and second components, rendering one or both of the first and second components unusable.

SUMMARY

In one general aspect, a splined coupling system includes a first mechanical component including a first mating portion, the first mating portion including a first splined portion and a first plurality of recesses; and a second mechanical component including a second mating portion, the second mating portion including a second splined portion and a second plurality of recesses. The second splined portion of the second mating portion may be configured to engage the first splined portion of the first mating portion to couple the first mechanical component and the second mechanical component. In a coupled state of the first mechanical component and the second mechanical component, the second plurality of recesses may be aligned with the first plurality of recesses to define a plurality of openings. The splined coupling system may also include a plurality of biased coupling members configured to be removably received in the plurality of openings.

In some implementations, in an installed state of the plurality of biased coupling members in the plurality of openings, a biasing force exerted on the first plurality of recesses and the second plurality of recesses by the plurality of biased coupling members restricts relative movement of the first mechanical component and the second mechanical component.

In some implementations, in an uninstalled state of the plurality of biased coupling members, the first mechanical component is movable relative to the second mechanical component for alignment of the first plurality of recesses with the second plurality of recesses.

In some implementations, the biasing force exerted on the first plurality of recesses and the second plurality of recesses by the plurality of biased coupling members restricts relative rotation of the first mechanical component and the second mechanical component.

In some implementations, a number of the plurality of biased coupling members is less than a number of the plurality of openings.

In some implementations, the plurality of biased coupling members includes at least one of a coiled spring pin or a slotted spring pin.

In some implementations, a biasing force exerted by each of the plurality of biased coupling members is variable.

In some implementations, the first plurality of recesses are formed in a portion of the first mating portion of the first mechanical component that is separate from the first splined portion; and the second plurality of recesses are formed in a portion of the second mating portion of the second mechanical component that is separate from the second splined portion.

In some implementations, the first mating portion is formed on an outer circumferential portion of the first mechanical component, and the second mating portion is formed on an inner circumferential portion of the second mechanical component In some implementations, the first mating portion includes a first rim portion extending along a periphery of the first splined portion, with the first plurality of recesses formed in the first rim portion; and the second mating portion includes a second rim portion extending along a periphery of the second splined portion, with the second plurality of recesses formed in the second rim portion.

In some implementations, the first mechanical component is a ring gear of a transmission mechanism of a powertrain system, and the second mechanical component is a fixed cast portion surrounding a portion of the powertrain system corresponding to the ring gear of the transmission mechanism.

In another general aspect, a method includes engaging a first mating surface of a first splined component with a second mating surface of a second splined component; aligning at least one first recess defined in the first mating surface with at least one second recess defined in the second mating surface to define at least one opening between the first mating surface and the second mating surface; and inserting a biased coupling device in the at least one opening, wherein the biased coupling device is configured to exert a biasing force on the at least one first recess and on the at least one second recess to maintain a relative position of the first splined component and the second splined component.

In some implementations, the aligning of the at least one first recess with the at least one second recess includes aligning a plurality of first recesses with a respective plurality of second recesses to define a respective plurality of openings between the first mating surface and second mating surface, and the inserting of the biased coupling device in the at least one opening includes inserting one or more biased coupling devices in a plurality of openings.

In some implementations, the inserting of the biased coupling device in the at least one opening includes inserting at least one of a coiled spring pin or a slotted spring pin into the at least one opening.

In another general aspect, a powertrain system includes a rotor; a stator surrounding the rotor; a drive axle; a transmission mechanism coupled to the rotor and configured to transmit a driving force from the rotor to the drive axle, the transmission mechanism includes a ring gear, the ring gear including a first mating portion including a first splined portion and a first plurality of recesses; and a cast portion surrounding the ring gear, the cast portion including a second mating portion including a second splined portion and a second plurality of recesses. The second splined portion of the cast portion may be configured to engage the first splined portion of the ring gear to couple the ring gear and the cast portion. In a coupled state of the ring gear and the cast portion, the second plurality of recesses may be aligned with the first plurality of recesses to define a plurality of openings. The powertrain system may also include a plurality of biased coupling members configured to be removably received in the plurality of openings.

In some implementations, in an installed state of the plurality of biased coupling members in the plurality of openings, a biasing force exerted on the first plurality of recesses and the second plurality of recesses by the plurality of biased coupling members restricts relative movement of the ring gear and the cast portion; and in an uninstalled state of the plurality of biased coupling members, the ring gear is movable relative to the cast portion for alignment of the first plurality of recesses with the second plurality of recesses.

In some implementations, the plurality of biased coupling members includes at least one of a coiled spring pin or a slotted spring pin.

In some implementations, a number of the plurality of biased coupling members is less than a number of the plurality of openings.

In some implementations, a biasing force exerted by each of the plurality of biased coupling members is variable.

In some implementations, the first mating portion includes a first rim portion extending along a periphery of the first splined portion, with the first plurality of recesses formed in the first rim portion; and the second mating portion includes a second rim portion extending along a periphery of the second splined portion, with the second plurality of recesses formed in the second rim portion.

The details of one or more implementations are set forth in the accompanying drawings and the description below. Other features will be apparent from the description and drawings, and from the claims.

BRIEF DESCRIPTION OF DRAWINGS

FIG. 2A is an exploded perspective view.

FIGS. 3A and 3B are perspective views of example biased coupling members.

In the drawings, like reference symbols or numerals are used to indicate like elements wherever practical.

DETAILED DESCRIPTION

Figure 1:
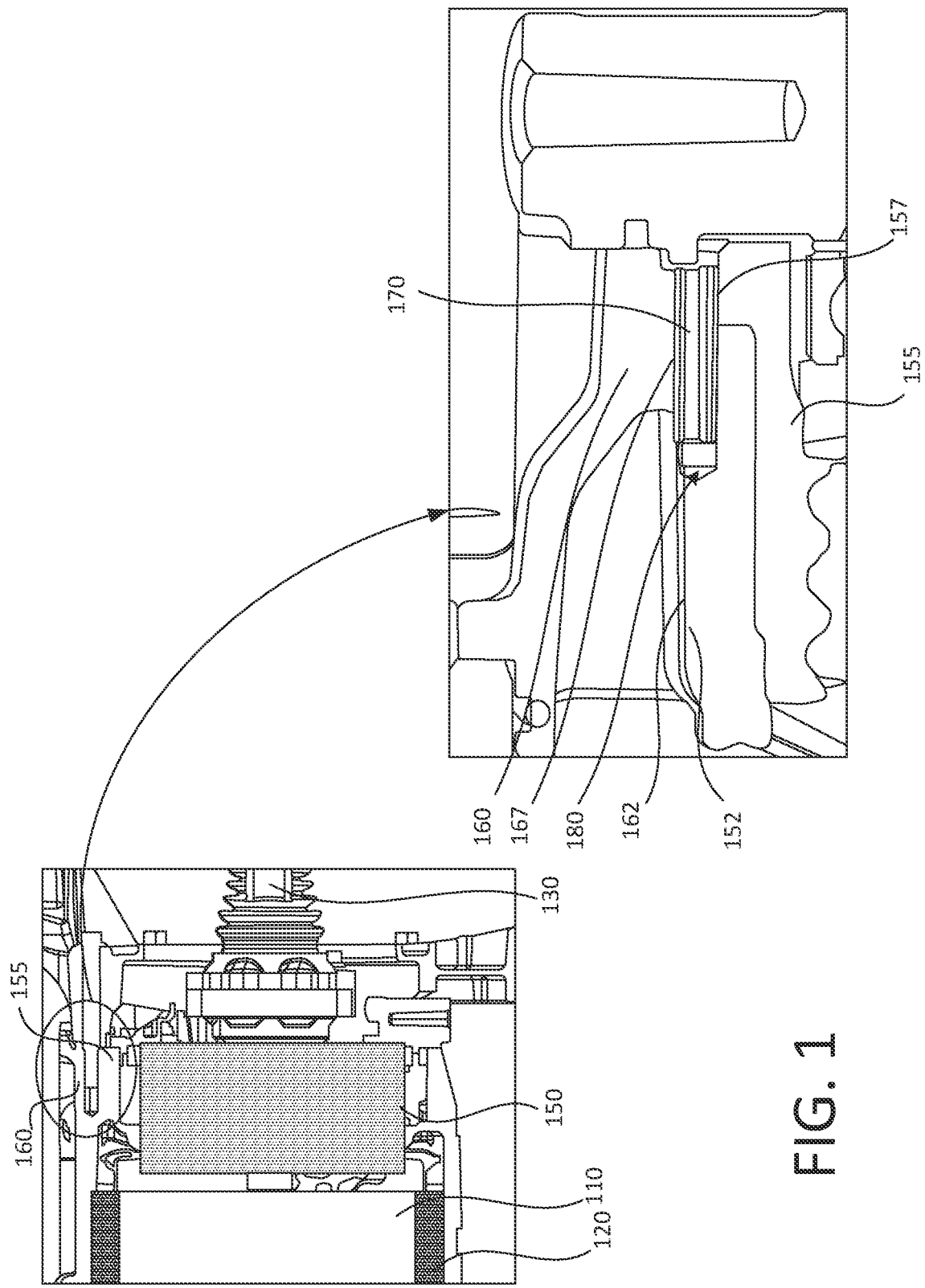
FIG. 1 is a schematic illustration of a portion of an example powertrain of an example vehicle.

A coupling of splined components that provides for clearances between splined surfaces to facilitate the positioning of the components for coupling, but that reduces or substantially eliminates the negative effects of backlash during operation, may improve overall performance and customer satisfaction in a system in which the coupled mechanical components are installed. Systems and methods for reducing or substantially eliminating backlash in the splined coupling of components, while still providing clearance between components for assembly and disassembly, are described herein. In a system and method, in accordance with implementations described herein, one or more biased coupling members are provided between mating first and second splined surfaces of respective first and second rigid components. In some examples, the one or more biased coupling members are installed after assembly of the first and second rigid components, and/or before disassembly of the first and second rigid components. In particular, during assembly, clearances between the splined surfaces of the first and second rigid components facilitate assembly of the first and second rigid components. The one or more biased coupling members are installed after the first and second rigid components are assembled through the mating of the respective splined surfaces. Similarly, the one or more biased coupling members are removed prior to disassembly of the first and second rigid components, to restore the clearances between the respective splined surfaces and facilitate disassembly of the first and second rigid components.

The variable stiffness provided by the one or more biased coupling members during operation of the assembled first and second components allows the first and second rigid components to operate in a substantially zero clearance state. This also provides the assembly tolerances that facilitate alignment of splines of the first and second splined surfaces of the first and second rigid components. This also provides for alignment of coupling holes and the like during assembly, as the one or more biased coupling members are not installed until after assembly. This also provides for the clearances that facilitate the disassembly of the first and second components without damage to the first and/or second components, as the one or more biased coupling members are removed prior to disassembly. The variable stiffness and flexure provided by the one or more biased coupling members, based on a magnitude, direction and the like of rotational and/or torsional forces applied during operation, may absorb the assembly/disassembly clearances between the splined surfaces of the first and second rigid components, thus reducing or substantially eliminating the effects of backlash. The reduction, or substantial elimination, of backlash may in turn reduce or substantially eliminate the detrimental effects of backlash, including, for example, noise, vibration, wear and the like.

Hereinafter, the use of one or more biased coupling members will be described with respect to the coupling or joining of splined surfaces of mating rotating mechanical components of a powertrain of a vehicle, simply for purposes of discussion and illustration. The principles to be described herein may be applied to the joining, or coupling, or mating of other rigid rotating mechanical components to reduce or substantially eliminate backlash. These other applications may include, for example, other portions of a vehicle powertrain, other areas of a vehicle outside of the powertrain, and numerous other systems in which splined surfaces are used to join two rigid rotating mechanical components.

FIG. 1 is a schematic illustration of a portion of an example powertrain of an example vehicle. The powertrain of FIG. 1 can be used with one or more other examples described elsewhere herein. In the example arrangement shown in FIG. 1, power generated by a rotor 110 and a stator 120 is transmitted to a drive axle 130 of the example vehicle via a transmission mechanism 150. In the example shown in FIG. 1, a ring gear 155 of the transmission mechanism 150 is coupled to a fixed cast portion 160 surrounding this portion of the example powertrain. In some examples, one or more biased coupling members 170, or biased coupling devices 170, are positioned between the ring gear 155 and the cast portion 160. As shown in FIG. 1, the biased coupling member 170, or biased coupling device 170, can be installed in a space between the ring gear 155 and the cast portion 160 defined by a recess 157 formed in the ring gear 155 that corresponds to a recess 167 formed in the cast portion 160. That is, the recess 157 may be defined in a mating surface of the ring gear 155, facing a mating surface in which the recess 167 in the cast portion 160 is formed. In the assembled state of the ring gear 155 and the cast portion 160, the recesses 157, 167 may be aligned to together define an opening 180 in which the biased coupling member 170, or biased coupling device 170, is installed.

In FIG. 1, the installation of one biased coupling member 170 between the ring gear 155 and the cast portion 160 is shown in enlarged detail, simply for ease of discussion and illustration. In the examples to be described below with respect to the remaining figures, additional biased coupling members 170 are installed between the ring gear 155 and the cast portion 160, in a similar manner to the example installation described with respect to FIG. 1, simply for purposes of discussion and illustration of the use of the biased coupling devices 170, or biased coupling members 170. The principles to be described herein may be applied to other types of planetary gear type mechanisms, and/or to other splined coupling arrangements to reduce backlash.

Figure 2B:
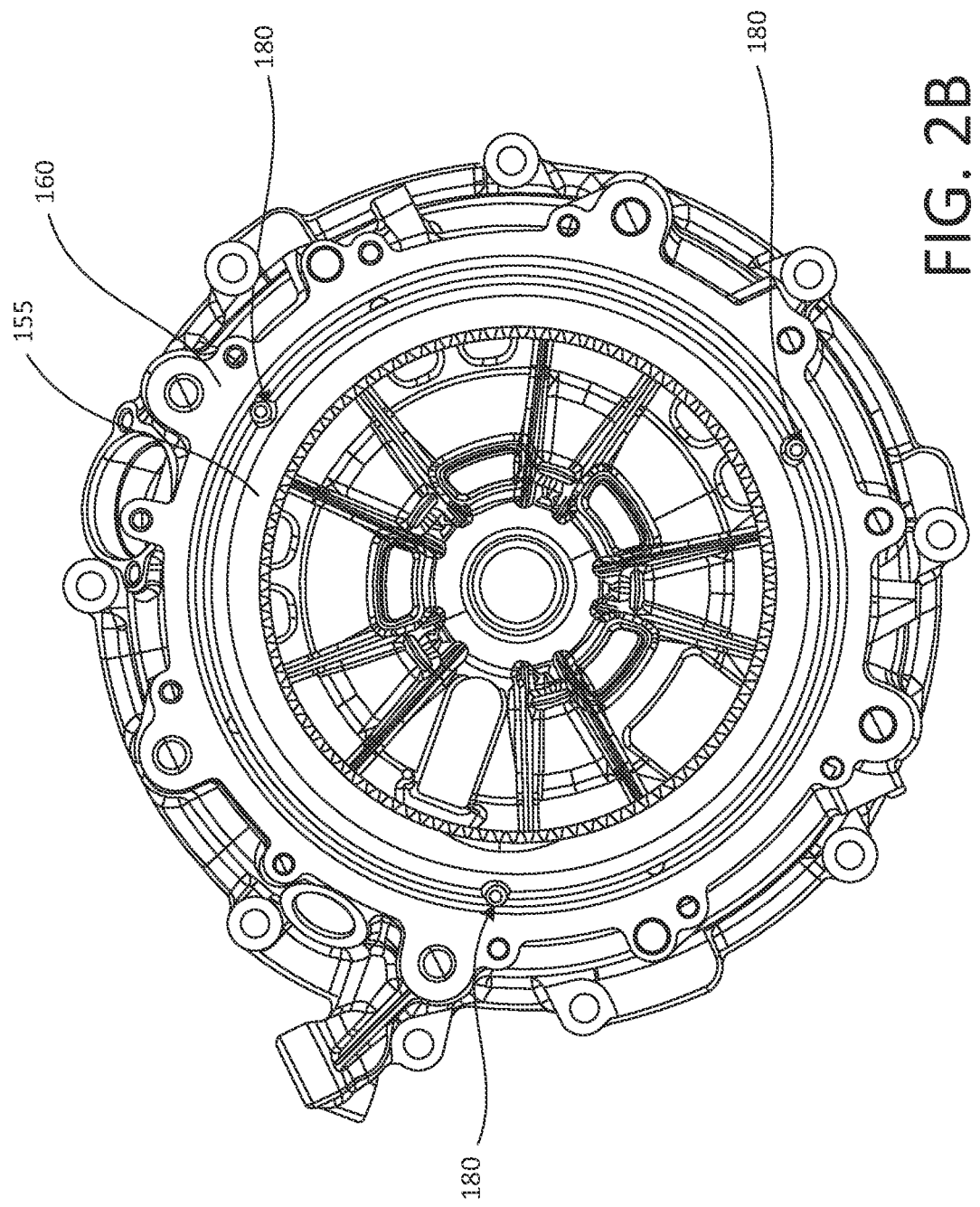
FIG. 2B is an axial end view of an example ring gear positioned in an example cast portion shown in FIG. 1.
Figure 2C:
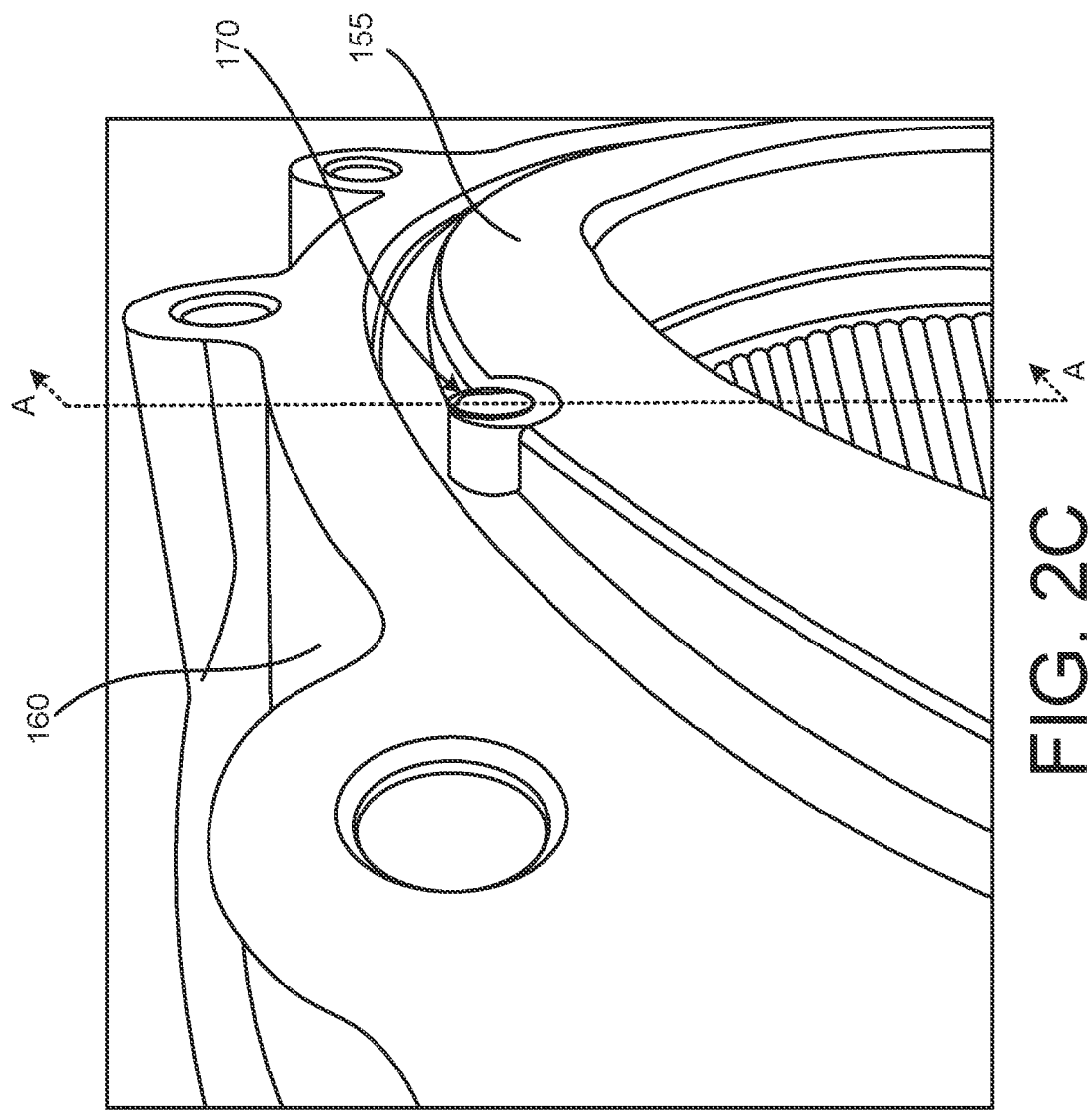
FIG. 2C is a side view of a portion of the assembled ring gear and cast portion shown in FIGS. 2A and 2B.
Figure 2D:
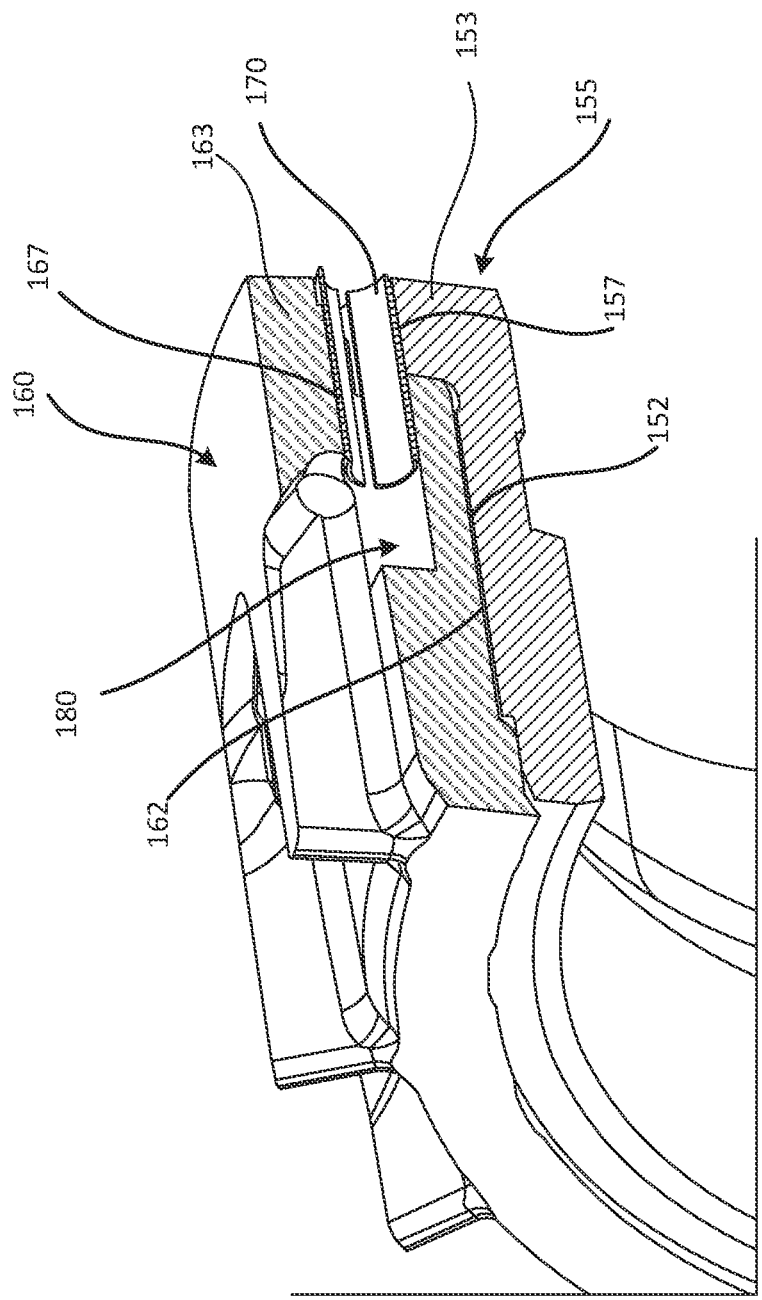
FIG. 2D is a partial cross-sectional view taken along line A-A of FIG. 2C.
Figure 2E:
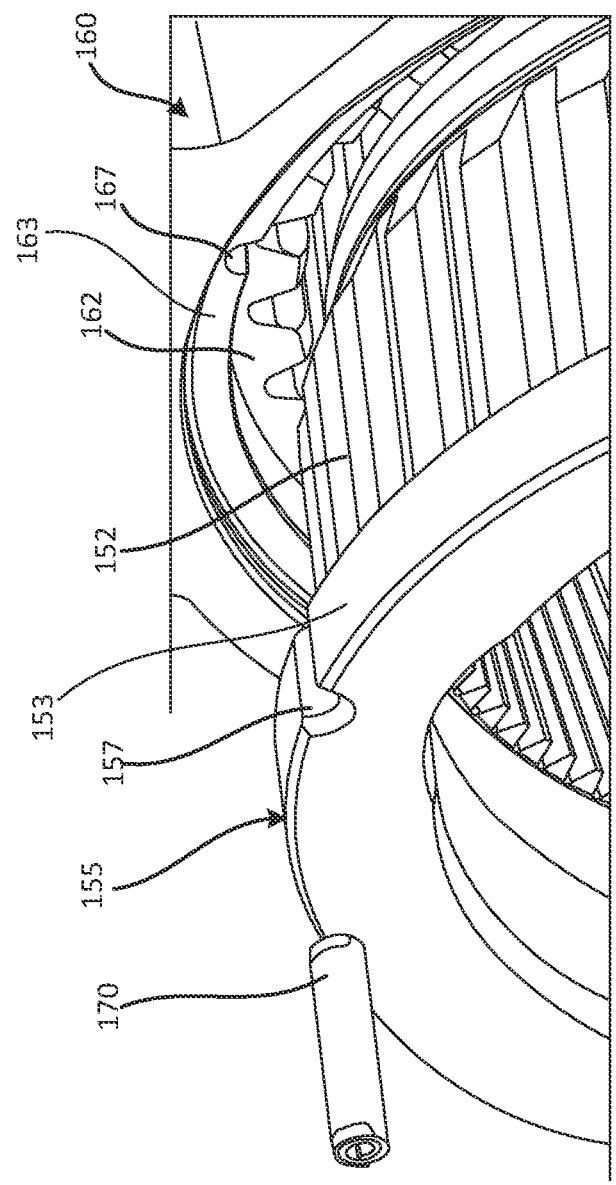
FIG. 2E is an exploded perspective view of the example ring gear and cast portion shown in FIGS. 2A and 2B.

FIG. 2A is an exploded perspective view, and FIG. 2B is an axial end view of the ring gear 155 positioned in the cast portion 160. FIG. 2C is a partial perspective view of a portion of the assembled ring gear 155 and cast portion 160. FIG. 2D is a partial cross-sectional view taken along line A-A of FIG. 2C. FIG. 2E is an exploded partial perspective view of the ring gear 155 and the cast portion 160.

In the example arrangement shown in FIGS. 2A-2E, a mating surface of the ring gear 155 is engaged with a mating surface of the cast portion 160. The mating surface of the ring gear 155 includes a splined portion 152 formed on an outer circumferential surface of the ring gear 155. The mating surface of the cast portion 160 includes a splined portion 162 formed on an inner circumferential surface of the cast portion 160. In some examples, the recesses 157 are formed in a rim portion 153 extending along a rim of the mating surface of the ring gear 155 that is separate from the splined portion 152 of the mating surface of the ring gear 155. In some examples, the recesses 167 are formed in a rim portion 153 extending along a rim of the mating surface of the cast portion 160 that is separate from the splined portion 162 of the mating surface of the cast portion 160. When positioning the ring gear 155 in the cast portion 160, the respective splined portions 152, 162 of the respective mating surfaces may be aligned such that the recesses 157 formed in the ring gear 155 align with the recesses 167 formed in the cast portion 160 to define the openings 180 in which the biased coupling members 170 are to be inserted. In some examples, the variable flexure, or compression, provided in the biased coupling members 170 may facilitate the assembly of the ring gear 155 and the cast portion 160. That is, in some situations, the recesses 157 formed in the ring gear 155 and the recesses 167 formed in the cast portion 160 may be somewhat offset from each other. In this situation, the flexure, or compressive properties of the biased coupling member 170 may compensate for some degree of misalignment between the recesses 157, 167 defining the openings 180, allowing the ring gear 155 and the cast portion 160 to be joined. The example arrangement shown in FIG. 2B includes three openings 180, for purposes of discussion and illustration. The assembled ring gear 155 and cast portion 160 can include recesses 157, 167 defining more, or fewer openings 180, arranged similarly or differently to the example arrangement shown in FIG. 2B.

FIGS. 3A and 3B are perspective views of example biased coupling members 170. In particular, FIG. 3A is a perspective view of an example biased coupling member 170 in the form of a coiled spring pin 170A. FIG. 3B is a perspective view of an example biased coupling member 170 in the form of a slotted spring pin 170B. The example biased coupling members 170 shown in FIGS. 3A and 3B are provided for purposes of discussion and illustration. The principles to be described herein may be applied using other types of biased coupling members that provide variable stiffness in a coupling space between splined mating surfaces of rigid rotating mechanical components.

The example biased coupling members 170 shown in FIGS. 3A and 3B may be selectively compressed, for example, for insertion into the openings 180 between the ring gear 155 and the cast portion 160 defined by the recesses 157, 167 defined in the respective mating surfaces thereof. Once installed in the openings 180, the example biased coupling members 170 shown in FIGS. 3A and 3B (i.e., the example coiled spring pin 170A shown in FIG. 3A and the example slotted spring pin 170B shown in FIG. 3B) may exert a variable biasing force on the ring gear 155 and the cast portion 160, based on a compressive force exerted on the biased coupling member 170. In the installed state of the biased coupling members 170 in the openings 180, this variable biasing force maintains a relative position of the ring gear 155 and the cast portion 160, and/or prevents relative movement, or rotation of the ring gear 155 and the cast portion 160, thus providing for flexible coupling between the assembled ring gear 155 and cast portion 160. In this example arrangement, one or more biased coupling members 170 installed in this manner may provide for some level of torque transmission between the splined portions 152, 162 of the respective mating surfaces during operation. In the uninstalled state, some level of movement between the ring gear 155 and the cast portion 160 may provide for the alignment of the recesses 157, 167 to form the openings 180. The example biased coupling members 170 shown in FIGS. 3A and 3B (i.e., the example coiled spring pin 170A shown in FIG. 3A and the example slotted spring pin 170B shown in FIG. 3B) are provided for purposes of discussion and illustration. Other types of coupling devices that provide for flexibility, particularly in the direction of a shear force exerted between two rigid rotating mechanical components, may be positioned between mating splined surfaces of the rigid mechanical rotating components.

In the example shown in FIG. 3A, the coiled spring pin 170A includes a sheet 175 of material that is wound about a longitudinal axis LA to define an elongated coil. In response to compression, a coil pattern of the coiled spring pin 170A may tighten in the direction of the arrow C1, thus temporarily reducing a diameter of the coiled spring pin 170A. The coiled spring pin 170A may experience compression, for example during insertion of the coiled spring pin 170A into the opening 180. The reduction in diameter of the coiled spring pin 170A under compression may facilitate the insertion of the coiled spring pin 170A into the opening 180. In a situation in which the recesses 157, 167 are not precisely the same size and/or precisely aligned due to, for example, manufacturing tolerances, resulting in a somewhat non-uniform opening 180, the ability of the coiled spring pin 170A to be variably compressed along its longitudinal length may further facilitate insertion of the coiled spring pin 170A into the opening 180. Upon insertion into the opening 180, the coiled spring pin 170A exerts a biasing force in the direction of the arrows C2 on the walls of the opening 180 defined by the recesses 157, 167 in the ring gear 155 and cast portion 160. A magnitude of the biasing force exerted by the coiled spring pin 170A may be based on the tightness of the winding of the coil of the coiled spring pin 170A received in the opening 180, and the forces exerted on the coiled spring pin 170A via the ring gear 155 and the cast portion 160. As forces (for example, rotational and/or torsional forces) are exerted on the ring gear 155 and the cast portion 160 during operation, the coiled spring pin 170A may exert a variable biasing force on the walls (i.e., the recesses 157, 167) of the opening 180 that maintains a relative position and/or restricts relative movement and/or rotation of the ring gear 155 and the cast portion 160. In this manner, backlash in the example ring gear 155 and cast portion 160 (and/or other such types of rigid rotating mechanical components) may be reduced or substantially eliminated.

Similarly, the slotted spring pin 170B includes a wall 174 of material having a C-shaped cross-section. A first end portion 174A and a second end portion 174B of the wall 174 define a slot 172 that extends in a longitudinal direction, corresponding to a longitudinal axis LB of the slotted spring pin 170B. In response to compression, the first and second end portions 174A, 174B of the wall 174 are moved together in the direction of the arrows D1, thus temporarily narrowing the slot 172 and reducing a diameter of the slotted spring pin 170B. The slotted spring pin 170B may experience compression, for example during insertion of the slotted spring pin 170B into the opening 180. The reduction in diameter of the slotted spring pin 170B under compression may facilitate the insertion of the slotted spring pin 170B into the opening 180. In a situation in which the recesses 157, 167 are not precisely the same size and/or precisely aligned due to, for example, manufacturing tolerances, resulting in a somewhat non-uniform opening 180, the ability of the slotted spring pin 170B to be variably compressed along its longitudinal length may further facilitate insertion of the slotted spring pin 170B into the opening 180. Upon insertion into the opening 180, the slotted spring pin 170B exerts a biasing force in the direction of the arrows D2 on the walls of the opening 180 defined by the recesses 157, 167 in the ring gear 155 and cast portion 160. A magnitude of the biasing force exerted by the slotted spring pin 170B may be based on a size of the slot 172 (based on a relative position of the first and second end portions 174A, 174B of the wall 174), and the forces exerted on the slotted spring pin 170B via the ring gear 155 and the cast portion 160. As forces (for example, rotational and/or torsional forces) are exerted on the ring gear 155 and the cast portion 160 during operation, the slotted spring pin 170B may exert a variable biasing force on the walls (i.e., the recesses 157, 167) of the opening 180 that maintains a relative position and/or restricts relative movement and/or rotation of the ring gear 155 and the cast portion 160. In this manner, backlash in the example ring gear 155 and cast portion 160 (and/or other such types of rigid rotating mechanical components) may be reduced or substantially eliminated.

Figure 4:
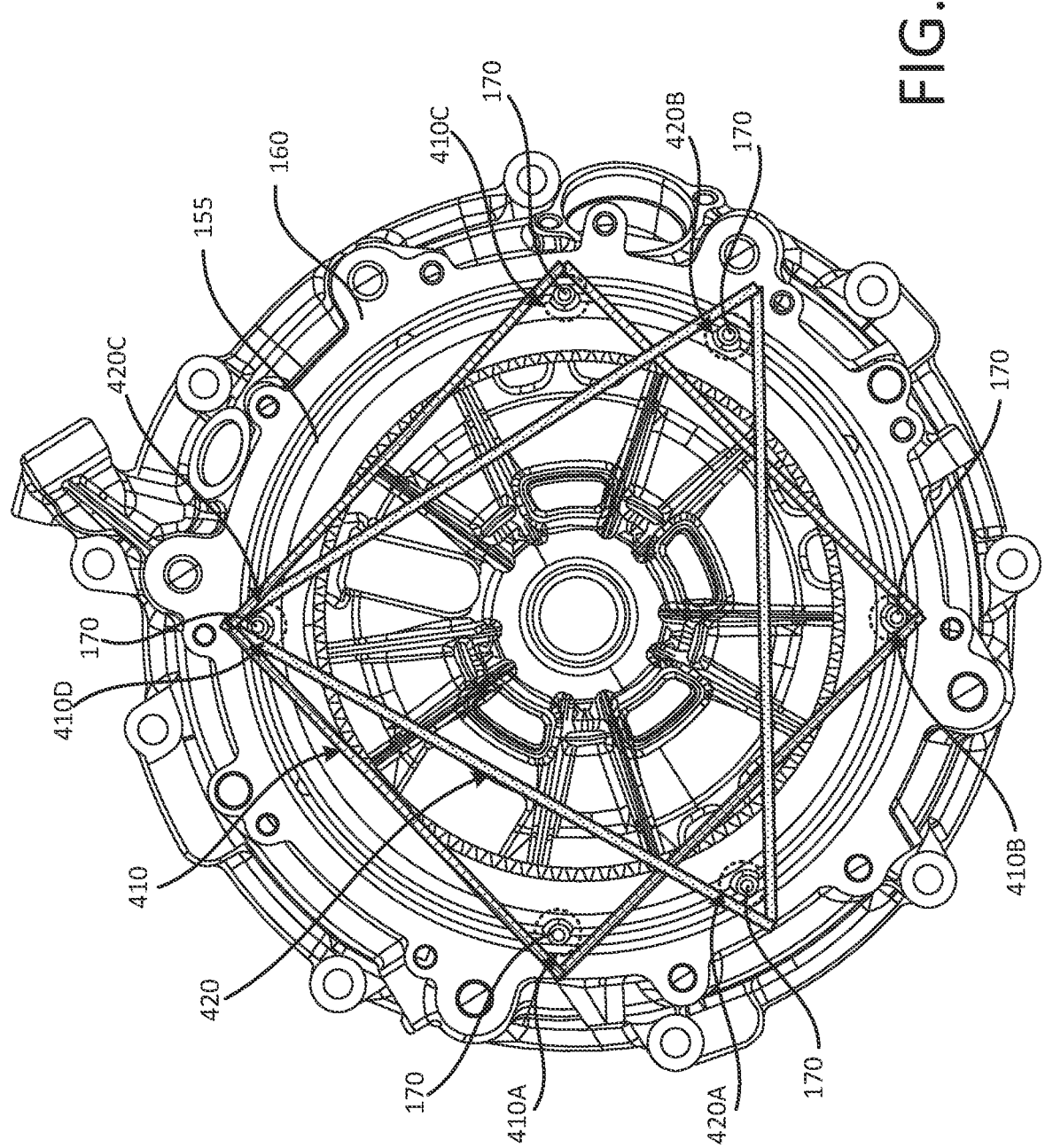
FIG. 4 is an axial end view of the assembled ring gear and cast portion shown in FIG. 2A, illustrating example positioning of a plurality of biased coupling members.

FIG. 4 is an axial end view of the assembled ring gear 155 and cast portion 160, illustrating different example positioning of the biased coupling members 170. The example arrangement shown in FIG. 4 includes six openings 180, positioned substantially symmetrically about a central plane of the ring gear 155 and the cast portion 160, and positioned substantially equidistant from each other, simply for purposes of discussion and illustration. The assembled ring gear 155 and cast portion 160 can include more, or fewer openings, arranged differently (i.e., asymmetrically, staggered and the like).

FIG. 4 illustrates two example patterns for placement of biased coupling members 170 in the assembled ring gear 155 and cast portion 160. The first pattern 410 includes four biased coupling members 170 positioned at four positions 410A, 410B, 410C and 410D that are arranged substantially symmetrically about a central plane of the assembled ring gear 155 and cast portion 160, and substantially equidistant from each other, in a substantially square pattern. The second pattern 420 includes three biased coupling members 170 positioned at three positions 420A, 420B and 420C that are arranged substantially equidistant from each other, in a substantially triangular pattern. The example first pattern 410 and the example second pattern 420 are explicitly shown for purposes of discussion and illustration. Other patterns of biased coupling member placement, including more, or fewer biased coupling members, may be applied.

A particular type of biased coupling member to use and/or a particular number of biased coupling members to use and/or particular placement positions for the one or more biased coupling members and/or how far to insert the biased coupling member(s) into the openings, and the like may be determined based on a number of factors. These factors may include, for example, a magnitude of rotational force and/or torsional force exerted on the assembled ring gear/cast portion, a biasing capability of the biased coupling member(s) and/or combinations of biased coupling member(s), a criticality of the installation position, and other such factors.

Terms such as "substantially" and "about" used herein are used to describe and account for small fluctuations, such as due to variations in processing. Also, when used herein, indefinite articles such as "a" or "an" may refer to "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, any logic flows depicted herein do not require the particular order shown, or sequential order, to achieve desirable results. In addition, other processes may be provided, or processes may be eliminated, from the described flows, and other components may be added to and/or removed from the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A splined coupling system, comprising:
   a first mechanical component including a first mating portion, the first mating portion including a first splined portion and a first plurality of recesses;
   a second mechanical component including a second mating portion, the second mating portion including a second splined portion and a second plurality of recesses, wherein
      the second splined portion of the second mating portion is configured to engage the first splined portion of the first mating portion to couple the first mechanical component and the second mechanical component; and
      in a coupled state of the first mechanical component and the second mechanical component, the second plurality of recesses is aligned with the first plurality of recesses to define a plurality of openings; and
   a plurality of biased coupling members configured to be removably received in the plurality of openings, wherein a number of the plurality of biased coupling members is less than a number of the plurality of openings.

2. The splined coupling system of claim 1, wherein, in an installed state of the plurality of biased coupling members in the plurality of openings, a biasing force exerted on the first plurality of recesses and the second plurality of recesses by the plurality of biased coupling members restricts relative movement of the first mechanical component and the second mechanical component.

3. The splined coupling system of claim 2, wherein, in an uninstalled state of the plurality of biased coupling members, the first mechanical component is rotatably movable by backlash relative to the second mechanical component for alignment of the first plurality of recesses with the second plurality of recesses.

4. The splined coupling system of claim 2, wherein the biasing force exerted on the first plurality of recesses and the second plurality of recesses by the plurality of biased coupling members restricts relative rotation of the first mechanical component and the second mechanical component.

5. The splined coupling system of claim 1, wherein the plurality of biased coupling members includes at least one of a coiled spring pin or a slotted spring pin.

6. The splined coupling system of claim 1, wherein
   the first plurality of recesses are formed in a portion of the first mating portion of the first mechanical component that is separate from the first splined portion; and
   the second plurality of recesses are formed in a portion of the second mating portion of the second mechanical component that is separate from the second splined portion.

7. The splined coupling system of claim 1, wherein the first mating portion is formed on an outer circumferential portion of the first mechanical component, and
   the second mating portion is formed on an inner circumferential portion of the second mechanical component.

8. The splined coupling system of claim 7, wherein
   the first mating portion includes a first rim portion extending along a periphery of the first splined portion, with the first plurality of recesses formed in the first rim portion; and
   the second mating portion includes a second rim portion extending along a periphery of the second splined portion, with the second plurality of recesses formed in the second rim portion.

9. The splined coupling system of claim 1, wherein
   the first mechanical component is a ring gear of a transmission mechanism of a powertrain system, and
   the second mechanical component is a fixed cast portion surrounding a portion of the powertrain system corresponding to the ring gear of the transmission mechanism.

10. A splined coupling system, comprising:
    a first mechanical component including a first mating portion, the first mating portion including a first splined portion and a first plurality of recesses;
    a second mechanical component including a second mating portion, the second mating portion including a second splined portion and a second plurality of recesses, wherein
       the second splined portion of the second mating portion is configured to engage the first splined portion of the first mating portion to couple the first mechanical component and the second mechanical component; and
       in a coupled state of the first mechanical component and the second mechanical component, the second plurality of recesses is aligned with the first plurality of recesses to define a plurality of openings; and a plurality of biased coupling members configured to be removably received in the plurality of openings, wherein a biasing force exerted by each of the plurality of biased coupling members is variable.

11. The splined coupling system of claim 10, wherein the plurality of biased coupling members includes at least one of a coiled spring pin or a slotted spring pin.

12. A method, comprising:

engaging a first mating surface of a first splined component with a second mating surface of a second splined component;

aligning at least one first recess defined in the first mating surface with at least one second recess defined in the second mating surface to define at least one opening between the first mating surface and the second mating surface; and inserting a biased coupling device in the at least one opening, wherein the biased coupling device is configured to exert a biasing force on the at least one first recess and on the at least one second recess to maintain a relative position of the first splined component and the second splined component, wherein the inserting of the biased coupling device in the at least one opening includes inserting a coiled spring pin in the at least one opening, the coiled spring pin including a sheet of material that is would about a longitudinal axis to define an elongated coil.

13. The method of claim 12, wherein the aligning of the at least one first recess with the at least one second recess includes aligning a plurality of first recesses with a respective plurality of second recesses to define a respective plurality of openings between the first mating surface and second mating surface, and the inserting of the biased coupling device in the at least one opening includes inserting one or more biased coupling devices in a plurality of openings.

14. A powertrain system, comprising:

a rotor;

a stator surrounding the rotor;

a drive axle;

a transmission mechanism coupled to the rotor and configured to transmit a driving force from the rotor to the drive axle, the transmission mechanism including a ring gear, the ring gear including a first mating portion including a first splined portion and a first plurality of recesses;

a cast portion surrounding the ring gear, the cast portion including a second mating portion including a second splined portion and a second plurality of recesses, wherein the second splined portion of the cast portion is configured to engage the first splined portion of the ring gear to couple the ring gear and the cast portion; and in a coupled state of the ring gear and the cast portion, the second plurality of recesses is aligned with the first plurality of recesses to define a plurality of openings; and a plurality of biased coupling members configured to be removably received in the plurality of openings;

wherein the first mating portion includes a first rim portion extending along a periphery of the first splined portion, with the first plurality of recesses formed in the first rim portion; and wherein the second mating portion includes a second rim portion extending along a periphery of the second splined portion, with the second plurality of recesses formed in the second rim portion.

15. The powertrain system of claim 14, wherein, in an installed state of the plurality of biased coupling members in the plurality of openings, a biasing force exerted on the first plurality of recesses and the second plurality of recesses by the plurality of biased coupling members restricts relative movement of the ring gear and the cast portion; and in an uninstalled state of the plurality of biased coupling members, the ring gear is rotatably movable by backlash relative to the cast portion for alignment of the first plurality of recesses with the second plurality of recesses.

16. The powertrain system of claim 14, wherein the plurality of biased coupling members includes at least one of a coiled spring pin or a slotted spring pin.

17. The powertrain system of claim 14, wherein a number of the plurality of biased coupling members is less than a number of the plurality of openings.

18. The powertrain system of claim 14, wherein a biasing force exerted by each of the plurality of biased coupling members is variable.

* * * * *